(12) United States Patent
Silva

(10) Patent No.: US 8,112,493 B2
(45) Date of Patent: Feb. 7, 2012

(54) PROGRAMMATIC ROLE-BASED SECURITY FOR A DYNAMICALLY GENERATED USER INTERFACE

(75) Inventor: Luciano M. Silva, Apex, NC (US)

(73) Assignee: International Business Machines Corporation, Armonk, NY (US)

(*) Notice: Subject to any disclaimer, the term of this patent is extended or adjusted under 35 U.S.C. 154(b) by 2750 days.

(21) Appl. No.: 10/759,409

(22) Filed: Jan. 16, 2004

(65) Prior Publication Data

US 2005/0198324 A1 Sep. 8, 2005

(51) Int. Cl.
G06F 15/16 (2006.01)

(52) U.S. Cl. ......................... 709/217; 709/229

(58) Field of Classification Search ............... 709/227, 709/228, 229
See application file for complete search history.

(56) References Cited

U.S. PATENT DOCUMENTS

| | | | |
|---|---|---|---|
| 6,434,607 B1 | 8/2002 | Haverstock et al. | |
| 6,985,946 B1* | 1/2006 | Vasandani et al. | 709/225 |
| 2002/0095571 A1 | 7/2002 | Bradee | |
| 2002/0154646 A1* | 10/2002 | Dubois et al. | 370/406 |
| 2003/0163513 A1* | 8/2003 | Schaeck et al. | 709/201 |
| 2003/0167298 A1* | 9/2003 | Bazinet et al. | 709/203 |
| 2006/0004887 A1* | 1/2006 | Schenk | 707/204 |
| 2006/0168152 A1* | 7/2006 | Soluk et al. | 709/220 |

OTHER PUBLICATIONS

Author Unknown, *Struts*, The Apache Struts Web Application Framework, Copyright © 2000-2003, Apache Software Foundation, http://jakarta.apache.org/struts (visited on Dec. 17, 2003).
Author Unknown, *JavaServer Pages{tm} Technology—White Paper*, Copyright © Sun Microsystems, Inc. <http://java.sun.com/jsp_utils/PrintPage.jsp?url=http%3A%2Fjava.sun.com%2Fproducts%2Fjsp%2F....> (visted on Dec. 17, 2003).

* cited by examiner

*Primary Examiner* — Joseph E. Avellino
*Assistant Examiner* — Jeong S Park
(74) *Attorney, Agent, or Firm* — Cuenot, Forsythe & Kim, LLC

(57) ABSTRACT

The present invention is a method, system and apparatus for programmatically applied role-based security in a dynamically generated user interface. In accordance with the present invention, a server page can be configured for processing by a server page engine. The server page can include at least one markup language fragment defining a user interface for a first view and an additional markup language fragment defining a link to a second view. A custom tag can be included in the additional markup language fragment to conditionally include the link to the second view only if a role detected for an end user attempting to access the first view also has been defined in a deployment descriptor as an authorized role for accessing the second view. Notably, in a preferred aspect of the invention, the first and second views can be JSPs and the deployment descriptor can be a configuration file for an application framework incorporating the JSPs. In this regard, the application framework can be the Struts framework.

12 Claims, 2 Drawing Sheets

PROGRAMMATIC ROLE-BASED SECURITY FOR A DYNAMICALLY GENERATED USER INTERFACE

BACKGROUND OF THE INVENTION

1. Statement of the Technical Field

The present invention relates to the field of role-based security and more particularly to the programmatic application of role-based security to a dynamically generated user interface.

2. Description of the Related Art

Software development models have progressed from the sequential architecture of several decades ago to the object oriented paradigm of today. Additionally, whereas many years ago it would have been reasonable to presume the installation and use of an application within a single platform, today distributed application configurations are the norm. Unlike the single platform model of the past, the modern distributed model presents several challenges both in the design and in the lifecycle maintenance of the distributed application. In particular, today each of developers, database administrators and user-interface designers participate in the development process, oftentimes, independently of each other.

To facilitate the maintenance of the distributed application, the well-known model-view-controller programming design pattern has been adopted for use in developing complex, distributed applications. In the model-view-controller pattern, the data processed within an application can be managed independently of the programming logic used to manipulate the data and to control the operational flow of the application. The user interface, too, can be developed and maintained separately from the data and the programming logic. In this way, user interface changes need not jeopardize the integrity of proving programming logic. Similarly, changes in the underlying programming logic need not affect the proven structure of the user interface.

To separate the presentation layer of an application from the programming logic of the application, dynamic user interface technologies have been developed including Java server pages (JSPs) as will be understood by the skilled artisan. JSPs can be viewed as markup language documents encapsulating program logic intended for execution in a server process external to a content browsing process rendering the markup language documents. In this regard, the encapsulated program logic can dynamically produce renderable output within the markup language document such that the user interface ultimately rendered by the content browser can be defined in real-time when the JSP has been invoked.

While dynamic user interface technologies have proven quite useful in enforcing the separation of the presentation layer from the programming logic layer of an application, separation is only but one concern in the development and deployment of a distributed application. Specifically, security and differential access for different users can be a critical element of a well-defined distributed application. For example, in an enterprise business application, managers may view certain confidential data which assembly-line employees may not. Similarly, corporate officers can modify and view even more sensitive data which managers cannot. Without providing a mechanism for differentially controlling access to different portions of the application, a wide scale deployment of the application will not be possible.

To enforce different access privileges in an application, role-based security principles have been incorporated into several frameworks which implement the programming model of separating the presentation layer from the program logic layer. Generally, different "roles" can be defined for different users of an application. When deploying the application, authorized roles can be listed in association with particular functions or modules of the application so that during the execution of the application, only those users having an authorized role can access the particular functions or modules. To that end, deployment descriptors have proven to be a convenient forum for associating roles with different views and corresponding program logic.

In operation, when an end user attempts to access a particular view, the deployment descriptor for the view can specify particular roles eligible to access the view. As such, the role of the end user can be compared to the specified roles in the deployment descriptor. If the role of the end user has been included in the listing of specified roles permitted to access the view, the view can be rendered for use by the end user. Otherwise, a message can be rendered indicating that the end user has attempted access to a view which the end user has not been authorized to view. While the message can suffice for the occasional attempt to access a view in an unauthorized manner, the end user cannot be faulted where an opportunity to access the view has been presented to the end user.

Specifically, it is well known to render linking user interface elements in one view which have been programmed to invoke another, separate view. Typically presented in the form of a button, the mere selection of the button can invoke the separate view. While access to the initial view may have been permitted based upon the role of the end user, access to the separate view may not be permitted. Yet, a link to the separate view will have been presented nonetheless. Receiving an "unauthorized access" message, then, can be frustrating for the end user and can run counter to well-known principles of the science of human factors.

SUMMARY OF THE INVENTION

The present invention addresses the deficiencies of the art in respect to applying role-based security to a user interface and provides a novel and non-obvious method, system and apparatus for programmatically applied role-based security in a dynamically generated user interface. In accordance with the present invention, a server page can be configured for processing by a server page engine. The server page can include at least one markup language fragment defining a user interface for a first view and an additional markup language fragment defining a link to a second view. A custom tag can be included in the additional markup language fragment to conditionally include the link to the second view only if a role detected for an end user attempting to access the first view also has been defined in a deployment descriptor as an authorized role for accessing the second view. Notably, in a preferred aspect of the invention, the first and second views can be JSPs and the deployment descriptor can be a configuration file for an application framework incorporating the JSPs. In this regard, the application framework can be the Struts framework.

A system for programmatic role-based security in a dynamically generated user interface can include an application framework configured through a deployment descriptor having a listing of a set of views, a listing of associated program logic and a listing of a set of authorized roles for selected ones of the views. A first view can be listed in the deployment descriptor and can include a linkage to a second view listed in the deployment descriptor. Importantly, access checking logic can be disposed in the first view and programmed to omit the linkage where a role of an end user accessing the first view is not authorized to access the second view according to the listing of the set of authorized roles in the deployment descriptor. Notably, the application framework can be the Struts framework. Also, the program logic can include servlets and the views can include JSPs. In this regard, the system can include a custom tag disposed in the first view for invoking the access checking logic and for omitting the linkage responsive to the access checking logic.

A method for programmatic role-based security in a dynamically generated user interface can include authenticating access to a rendering of a selected view based upon a role of an end user requesting access to the selected view. The selected view can be processed to identify a method call to access checking logic. The role can be compared to a set of roles authorized to access a different view associated with the access checking logic. Accordingly, a link to the different view can be disposed in the rendering of the selected view if the role matches a role in the set. Preferably, the step of authenticating can include comparing the role to a set of roles associated with the selected view to locate a match for the role. The locating step, by comparison, can include the step of parsing a deployment descriptor for an application framework hosting the selected view and the different view to identify the set of roles. Finally, the processing step can include the step of invoking external access checking logic for a located server page tag referencing the access checking logic.

In accordance with the present invention, a method for programmatic role-based security in a dynamically generated user interface can include configuring a deployment descriptor to specify a set of roles authorized to access renderings of different views in a distributable application. External access checking logic can be programmed to match a parameterized role with a role disposed in the set of roles in the deployment descriptor. As such, a server page can be composed to include a reference to the external access checking logic and to invoke the external access in order to conditionally incorporate a link to a specific view associated with a specific set of authorized roles.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for programmatic role-based security in a dynamically generated user interface. In accordance with the present invention, a deployment descriptor can be configured to associate selected application actions with corresponding views in the application. A further selection of authorized roles can be associated with the views. Only those individual end users having an association with one or more of the roles associated with the views can be permitted to access the views.

Importantly, within the accessible view, a user interface linkage to another view can be conditionally modified to be selectably omitted where the role of an end user accessing the view is not also included among a set of roles authorized to access the linked view. Specifically, where the role of an end user would not permit access to a particular view, any linkage to the particular view within an accessible view can be omitted by operation of the accessible view. Consequently, an end user will be less likely to encounter an unauthorized access message responsive to an attempt by the end user to access an unauthorized view through a linkage within an accessible view of which the end user has been authorized to access.

It will be understood by those skilled in the art that the deployment descriptor can be a configuration document deployed within an application framework to configure controlling logic for the application. In this regard, the framework can comport with a model-view-controller type architecture in which server page type markup language documents can form the basis of a view, while server-side logic can form the basis of the model. A central controller can be provided by the framework to map the operation of the application with specific views through which end users can interact with server-side logic. Finally, custom tags within the view can trigger the execution of additional server-side logic.

Figure 1:
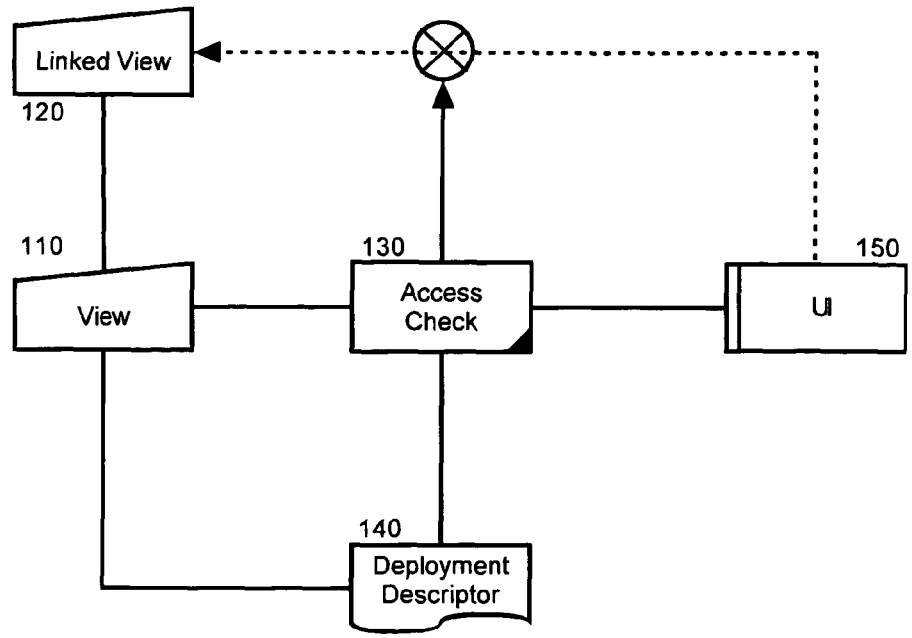
FIG. 1 is a schematic illustration of a system for programmatic role-based security in a dynamically generated user interface.

In further illustration of the system, method and apparatus of the present invention, FIG. 1 is a schematic illustration of a system for programmatic role-based security in a dynamically generated user interface. The system can include an application defined by one or more server side logical programs or scripts, and corresponding views to the server side logical programs or scripts. In a preferred aspect of the invention, the server side logical programs or scripts can include Java servlets disposed in an application server. The views for the servlets can be produced dynamically through JSP technology as is well known in the art. Preferably, the entire composition of servlets and JSPs can be arranged in a composition according to a defined framework such as the open source "Struts" framework.

In accordance with the present invention, the system can include an access checking processor 130 configured to process the deployment descriptor 140 for the application. Specifically, the access checking processor 130 can compare authorized roles for a selected view 110 listed in a deployment descriptor 140 for the selected view 110 with the roles of end users attempting to access the selected view 110. If role of the end user meets the role criteria established in the deployment descriptor 140, the user interface 150 defined by the selected view 110 can be rendered. Otherwise, an unauthorized message can be rendered.

Notably, the selected view 110 can include an internal linkage to a linked view 120. The internal linkage can be embodied in a hyperlink, button, or menu choice, to name a few. The linked view 120, like the selected view 110 can be defined by a markup language document encapsulating program logic for execution externally to a content browsing process configured to render the markup language document. As before, JSP technology represents a preferred embodiment of the foregoing markup language document.

In any case, a custom tag can be disposed within the selected view 110 about the linkage to the linked view 120. The custom tag can invoke the access checking process 130 to determine whether the role of an end user accessing the selected view 110 also is authorized to access the linked view 120 according to deployment descriptor 140. Where the role of the end user matches a permitted role in the deployment descriptor 140 for the linked view 120, the linkage to the linked view 120 can be rendered as a user interface for the selected view 110 is rendered by the rendering engine. Otherwise, the linkage to the linked view 120 can be omitted from the rendering of the selected view 110.

Figure 2:
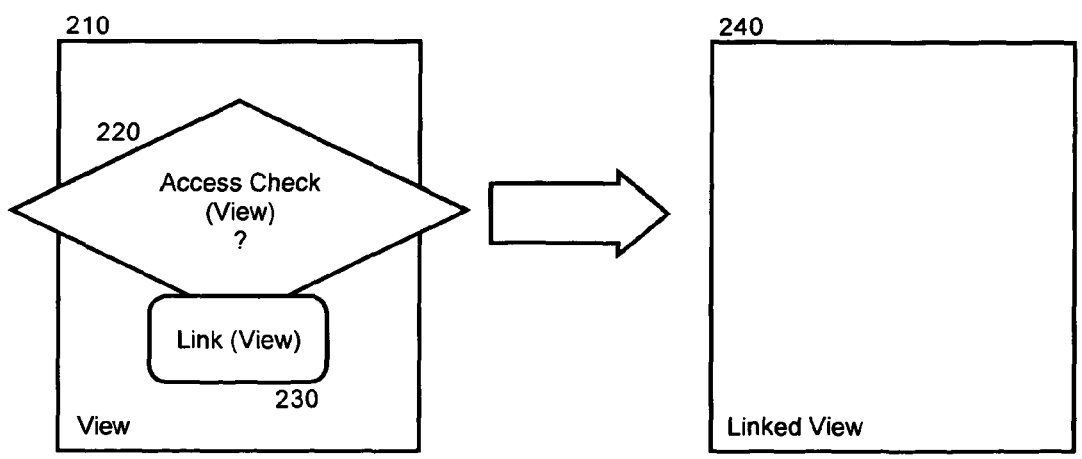
FIG. 2 is a pictorial illustration of a process for programmatic role-based security in a dynamically generated user interface; and, FIG. 3 is a flow chart illustrating a process for programmatic role-based security in a dynamically generated user interface.

To further illustrate the foregoing process, FIG. 2 is a pictorial illustration of a process for programmatic role-based security in a dynamically generated user interface. As shown in FIG. 2, a view 210 can incorporate access checking logic 220 in association with markup defining a linkage 230 to a linked view 240. The access checking logic 220 can produce a determination whether a role associated with an end user accessing the view 210 also can access the linked view 240 based upon a set of role-based security permissions defined in a corresponding deployment descriptor. In this regard, preferably the access checking logic 220 can be a custom tag in a JSP which calls logic for determining whether the markup defining the link 230 ought to be rendered in the view 210.

Figure 3:
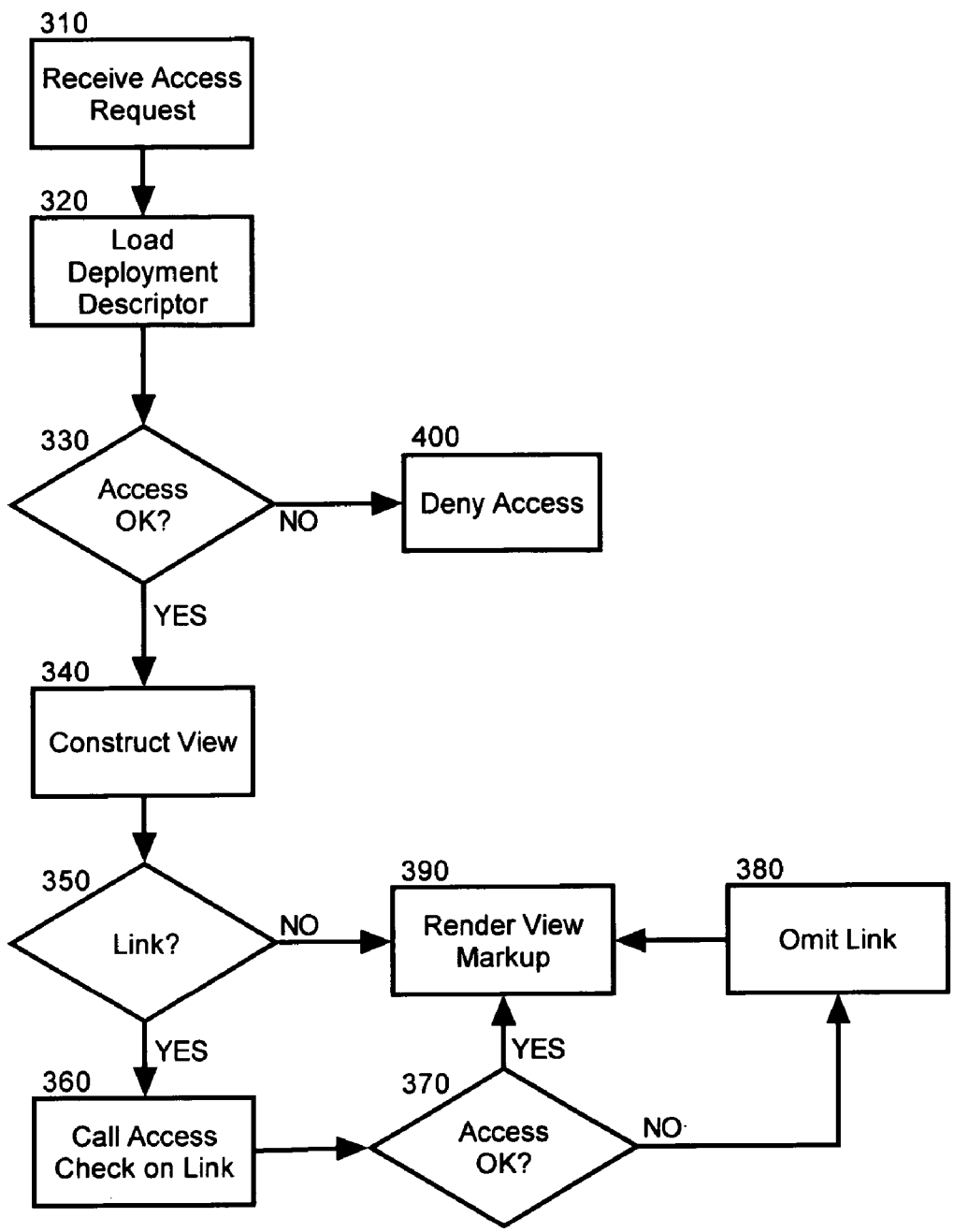

As a more specific illustration, FIG. 3 is a flow chart illustrating a process for programmatic role-based security in a dynamically generated user interface. Beginning in block 310, an access request for a first view can be received in the application framework. In block 320, a deployment descriptor for the application framework can be loaded if the deployment descriptor already had not been loaded. The deployment descriptor can be consulted to determine in decision block 330 whether the role of the accessing end user has been listed as an authorized role in association with the first view. If not, in block 400 access to the first view can be denied. Otherwise, the process can continue through block 340.

In block 340, the view can be processed in order to produce a dynamic user interface for the view. As is well known in the art, to the extent the view is embodied in an activated server page such as a JSP, the logic disposed within the view can be compiled and executed to dynamically produce markup fragments to be combined with statically defined markup fragments in the view. In block 350, if logic is detected which relates to the conditional inclusion of a link to a second view, in block 360 the logic can be executed to check role-based permissions for accessing the second view. If in decision block 370 the role of the end user attempting to access the first view would not also be permitted to access the second view, in block 380 the markup linking the second view to the first view can be omitted from the markup produced by the view. Finally, in block 390 the markup produced by the view can be returned for rendering.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:

1. A system for programmatic role-based security in a dynamically generated user interface, the system comprising:
 a processor;
 an application framework configured through a deployment descriptor comprising a listing of a set of views, a listing of associated program logic and a listing of a set of authorized roles for selected ones of said views;
 a first view listed in said deployment descriptor and comprising a linkage to a second view listed in said deployment descriptor; and,
 access checking logic disposed in said first view and programmed to omit said linkage where a role of an end user accessing said first view is not authorized to access said second view according to said listing of said set of authorized roles in said deployment descriptor.

2. The system of claim 1, wherein said application framework comprises the Struts framework.

3. The system of claim 1, wherein said program logic comprises servlets and wherein said views comprise Java server pages (JSPs).

4. The system of claim 3, further comprising a custom tag disposed in said first view for invoking said access checking logic and for omitting said linkage responsive to said access checking logic.

5. The system of claim 1, wherein said access checking logic is programmed to display said linkage where a role of the end user accessing said first view is authorized to access said second view.

6. A method for programmatic role-based security in a dynamically generated user interface, comprising:
 authenticating access to a rendering of a selected view based upon a role of an end user requesting access to said selected view;
 processing said selected view to identify a method call to access checking logic;
 comparing said role to a set of roles authorized to access a different view associated with said access checking logic; and
 selecting to dispose a link to said different view in said rendering of said selected view conditional upon said role matches a role in said set of roles, wherein said access checking logic disposed in said selected view and programmed to omit said link upon said role of said end user accessing said selected view is not authorized to access said different view.

7. The method of claim 6, wherein said step of authenticating comprises the step of comparing said role to a set of roles associated with said selected view to locate a match for said role.

8. The method of claim 7, wherein
said locating step comprises the step of parsing a deployment descriptor for an application framework hosting said selected view and said different view to identify said set of roles.

9. A machine readable storage having stored thereon a computer program for programmatic role-based security in a dynamically generated user interface, the computer program comprising a routine set of instructions which when executed by a machine cause the machine to perform:
authenticating access to a rendering of a selected view based upon a role of an end user requesting access to said selected view;
processing said selected view to identify a method call to access checking logic;
comparing said role to a set of roles authorized to access a different view associated with said access checking logic; and
selecting to dispose a link to said different view in said rendering of said selected view conditional upon said role matches a role in said set of roles, wherein
said access checking logic disposed in said selected view and programmed to omit said link upon said role of said end user accessing said selected view is not authorized to access said different view.

10. The machine readable storage of claim 9, wherein said step of authenticating comprises the step of comparing said role to a set of roles associated with said selected view to locate a match for said role.

11. The machine readable storage of claim 10, wherein said locating step comprises the step of parsing a deployment descriptor for an application framework hosting said selected view and said different view to identify said set of roles.

12. The machine readable storage of claim 9, wherein said processing step comprises the step of invoking external access checking logic for a located server page tag referencing said access checking logic.

\* \* \* \* \*